United States Patent
Wang et al.

(10) Patent No.: US 10,511,556 B2
(45) Date of Patent: Dec. 17, 2019

(54) BURSTY DETECTION FOR MESSAGE STREAMS

(71) Applicant: FUJITSU LIMITED, Kawasaki-shi, Kanagawa (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 15/710,684

(22) Filed: Sep. 20, 2017

(65) Prior Publication Data

US 2019/0089659 A1     Mar. 21, 2019

(51) Int. Cl.
*H04L 12/58*     (2006.01)
*G06F 3/048*     (2013.01)

(52) U.S. Cl.
CPC .............. *H04L 51/10* (2013.01); *H04L 51/16* (2013.01); *G06F 3/048* (2013.01)

(58) Field of Classification Search
CPC ................................ H04L 51/10; H04L 51/16
See application file for complete search history.

(56) References Cited

U.S. PATENT DOCUMENTS

| | | | |
|---|---|---|---|
| 2007/0203674 A1* | 8/2007 | Radulovic | H04L 43/00 702/189 |
| 2008/0155465 A1* | 6/2008 | Fu | G06F 17/30867 715/803 |
| 2009/0024555 A1* | 1/2009 | Rieck | G06F 7/02 706/54 |
| 2012/0131139 A1* | 5/2012 | Siripurapu | G06F 17/30864 709/217 |
| 2014/0040281 A1* | 2/2014 | Spivack | G06F 17/3053 707/748 |
| 2014/0096249 A1* | 4/2014 | Dupont | G06F 21/00 726/23 |
| 2014/0164344 A1* | 6/2014 | Tomkins | G06F 17/30864 707/706 |
| 2015/0120717 A1* | 4/2015 | Kim | G06F 17/30699 707/727 |

(Continued)

OTHER PUBLICATIONS

J. Kleinberg. Bursty and Hierarchical Structure in Streams. Proc. 8th ACM SIGKDD Intl. Conf. on Knowledge Discovery and Data Mining, 2002.

(Continued)

*Primary Examiner* — Jael M Ulysse
(74) *Attorney, Agent, or Firm* — Maschoff Brennan

(57) ABSTRACT

A method may include receiving one or more electronic message streams. The method may also include selecting a time range for analysis of the one or more electronic message streams. The method may include analyzing a set of historic data of the one or more electronic message streams. The method may also include identifying one or more bursty phrases in the set of historic data of the one or more electronic message streams in the selected time range. The method may further include clustering the bursty phrases in one or more bursty topics. The method may include generating a rank for each of the one or more bursty topics. The method may also include displaying the one or more bursty topics in a graphical user interface (GUI) in view of the rank. The method may include storing the one or more bursty topics.

17 Claims, 8 Drawing Sheets

(56) References Cited

U.S. PATENT DOCUMENTS

| | | | | |
|---|---|---|---|---|
| 2015/0262077 A1* | 9/2015 | White | | G06N 99/005 706/12 |
| 2015/0350149 A1* | 12/2015 | Acharya | | H04L 51/32 709/206 |
| 2017/0300582 A1* | 10/2017 | King | | G06Q 10/10 |
| 2018/0005131 A1* | 1/2018 | Yin | | G06N 7/005 |
| 2018/0181626 A1* | 6/2018 | Lyons | | G06Q 10/00 |
| 2019/0044898 A1* | 2/2019 | Shioya | | H04L 51/043 |

OTHER PUBLICATIONS

Yusuke Takahashi, Takehito Utsuro, Masaharu Yoshioka, Noriko Kando, Tomohiro Fukuhara, Hiroshi Nakagawa, Yoji Kiyota, Applying a Burst Model to Detect Bursty Topics in a Topic Model, 8th International Conference on NLP, JapTAL 2012, Kanazawa, Japan, Oct. 22-24, 2012.

Qiming Diao, Jing Jiang, Feida Zhu, Ee-Peng Lim, Finding Bursty Topics from Microblogs, ACL 2012.

Xiaohui Yan, Jiafeng Guo, Yanyan Lan, Jun Xu, and Xueqi Cheng. 2015. A probabilistic model for bursty topic discovery in microblogs. In Proceedings of the Twenty-Ninth AAAI Conference on Artificial Intelligence (AAAI'15).

Michael Mathioudakis and Nick Koudas. 2010. TwitterMonitor: trend detection over the twitter stream. In Proceedings of the 2010 ACM SIGMOD International Conference on Management of data (SIGMOD '10).

Chenliang Li, Aixin Sun, and Anwitaman Datta. 2012. Twevent: segment-based event detection from tweets. In Proceedings of the 21st ACM international conference on Information and knowledge management (CIKM '12).

Wei Xie, Feida Zhu, Jing Jiang, Ee-Peng Lim, and Ke Wang, TopicSketch: Real-time Bursty Topic Detection from Twitter, IEEE Transactions on Knowledge & Data Engineering 2016 vol. 28 Issue No. 8—Aug.

* cited by examiner

BURSTY DETECTION FOR MESSAGE STREAMS

FIELD

The embodiments discussed herein are related to bursty detection for message streams.

BACKGROUND

In this information age, there is an overwhelming amount of information readily available and accessible partly due to the ability of individuals to disseminate information freely, quickly, and easily. Often, people may be interested in specific pieces of information. Although the Internet is a vast trove of information, the information may be scattered online among various websites and platforms. Because of the vastness of the scattered information available on the Internet, it may be difficult for a user to search, aggregate, collect and organize information.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving one or more electronic message streams. The method may also include selecting a time range for analysis of the one or more electronic message streams. The method may include analyzing a set of historic data of the one or more electronic message streams. The method may also include identifying one or more bursty phrases in the set of historic data of the one or more electronic message streams in the selected time range. The method may further include clustering the bursty phrases in one or more bursty topics. The method may include generating a rank for each of the one or more bursty topics. The method may also include displaying the one or more bursty topics in a graphical user interface (GUI) in view of the rank. The method may include storing the one or more bursty topics.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
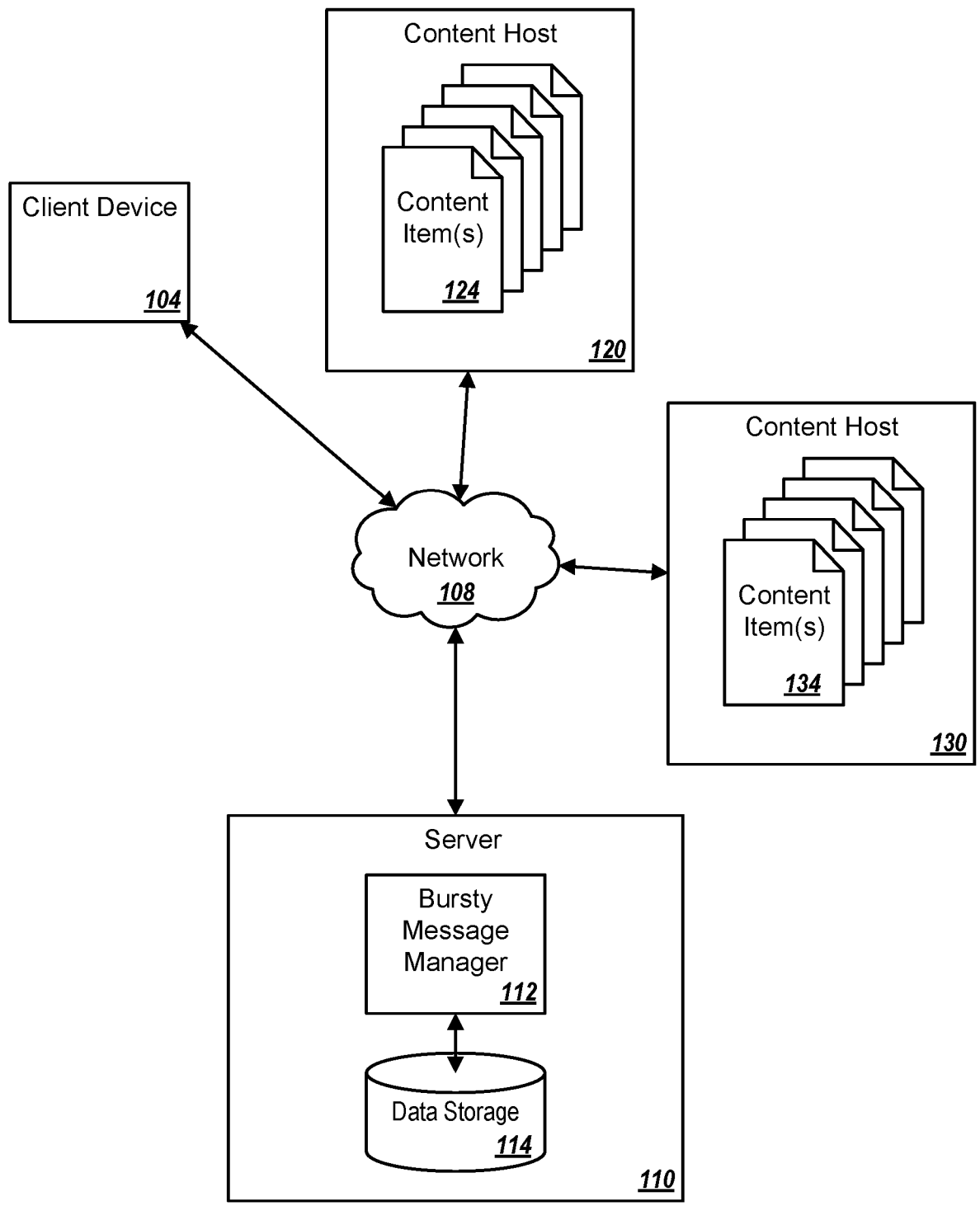
FIG. 1 illustrates an example network architecture.

Online chat is becoming an increasingly important communication channel, particularly as more people now have access to mobile devices than ever before. Further, social media programs and applications are becoming an increasingly popular avenue for users to gather various information about topics that may be of interest to the users. Mobile devices permit users to post information online nearly in real-time. For example, users may use various online chats and/or microblogs to disseminate and obtain information in a much faster manner than previous offline methods (e.g., newspaper, television). Just because information can be posted nearly in real-time, however, does not necessarily mean that this information is easily identifiable. For example, a spectator of an event may post live updates of the event to a microblog. This information may be timely and relevant to another user, but the other user may not be able to quickly identify the microblog of the spectator or the live updates. Similarly, while multiple spectators may be posting live updates of the event to their respective microblogs, these microblogs may not be easily identifiable to the other user. Thus, conventional systems have problems with the discovery of various types of content, particularly bursty topics in short message streams.

Some conventional approaches to grouping messages are based on a time-series analysis and may only consider single word instead of a topic or topics. Other conventional approaches may use a probabilistic topic model for lengthier publications, but the topic model approach may not work well for shorter messages that typically come from short message streams.

Aspects of the present disclosure address these and other shortcomings of conventional online communication systems by providing discovery of bursty topics from message streams, such as online chats, forums or microblogs. As the term is used herein, "bursty" may refer to related to an event occurring at intervals in short sudden episodes or groups. "Bursty topics" may refer to a group of messages for a related topic that may occur at intervals in short sudden episodes or groups. For example, a bursty topic may include a group of messages that are related to a sporting event. The systems and methods described herein may be able to detect bursty topics. By identifying bursty topics, the systems and methods may permit users to identify emerging trends and/or potential problems earlier. Earlier discovery may lead to quicker dissemination of information and/or a quicker resolution to a problem. The systems and methods described herein may find bursty phrases based on repeated pattern mining and a state based time-series analysis. The systems and methods described herein may cluster the bursty phrases into topics based on time-series correlation and sematic similarity.

According to an aspect of an embodiment, a method may include receiving one or more electronic message streams. The method may also include selecting a time range for analysis of the one or more electronic message streams. The method may include analyzing a set of historic data of the one or more electronic message streams. The method may also include identifying one or more bursty phrases in the set of historic data of the one or more electronic message streams in the selected time range. The method may further include clustering the bursty phrases in one or more bursty topics. The method may include generating a rank for each of the one or more bursty topics. The method may also include displaying the one or more bursty topics in a graphical user interface (GUI) in view of the rank. The method may include storing the one or more bursty topics.

FIG. 1 illustrates an example network architecture 100 in which embodiments of the present disclosure may be implemented. The network architecture 100 may include a client device 104, a network 108, a server 110, and one or more content hosts 120, 130.

The client device 104 may include a computing device such as personal computer (PC), laptop, mobile phone, smart phone, tablet computer, netbook computer, e-reader, personal digital assistant (PDA), or cellular phone, etc. While only one client device is illustrated in FIG. 1, network architecture 100 may include any number client devices. The client device 104 may be configured to provide a user interface in a browser or other application that allows a user to post and read messages. The browser or other application may also display the one or more bursty topics in a graphical user interface (GUI) in view of the rank. For example, the browser or other application may present the one or more bursty topics in an ordered list according to the respective ranks of the one or more busty topics.

The network 108 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network), routers, hubs, switches, server computers, and/or a combination thereof.

The server 110 may include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The content hosts 120, 130 may each include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. In at least one embodiment, the content hosts 120, 130 may be configured as a node in a peer-to-peer (P2P) network. The content hosts 120, 130 may receive and send any number of content items 124, 134 (e.g., messages, chats, blogs, posts) to and from the client device 104 and/or to the server 110 via the network 108. The content hosts 120, 130 may provide any number of content items 124, 134 in a message stream. In at least one embodiment, the content hosts 120, 130 may be each configured to host a separate message stream that may be accessible via the network 108. Specifically, in some embodiments, the content host 120 may allow access to a first message stream by the client device 104, and/or the server 110 by the bursty message manager 112. In some embodiments, the content host 130 may allow access to a second message stream by the client device 104, and/or the server 110 by the bursty message manager 112. The content hosts 120, 130 may generate respective message streams by receiving messages from one or more client devices. For example, the content host 120 may generate the first message stream based on messages received from hundreds of users via their respective client devices.

The server 110 may include a bursty message manager 112 that may systematically collect online resources (e.g., content item(s) 124, 134) from one or more content hosts 120, 130, analyze the content items, determine bursty phrases, and provide an output related to the bursty phrases. For example, the bursty message manager 112 may detect bursty topics or events from message streams such as chat or microblog messages, and help to discover and address various emerging issues earlier. The bursty message manager 112 may be configured to collect messages via the network 108. The bursty message manager 112 may receive one or more electronic message streams. The bursty message manager 112 may select a time range for analysis of the one or more electronic message streams. The bursty message manager 112 may analyze a set of historic data of the one or more electronic message streams. The bursty message manager 112 may identify one or more bursty phrases in the set of historic data of the one or more electronic message streams in the selected time range. The bursty message manager 112 may cluster the bursty phrases in one or more bursty topics. The bursty message manager 112 may generate a rank for each of the one or more bursty topics. The bursty message manager 112 may output the one or more bursty topics in a graphical user interface (GUI) in view of the rank. The bursty message manager 112 may store the one or more bursty topics. Functions and operations of the bursty message manager 112 are further described in conjunction with FIGS. 2-7.

Modifications, additions, or omissions may be made to the network architecture 100 without departing from the scope of the present disclosure. Specifically, embodiments of the network architecture 100 depicted in FIG. 1 include one client device 104, one server 110, one content host 120, and one content host 130. However, the present disclosure more generally applies to the network architecture 100 including one or more client devices 104, one or more servers 110, one or more content hosts 120, 130 or any combination thereof Moreover, the separation of various components in the embodiments described herein is not meant to indicate that the separation occurs in all embodiments. In addition, it may be understood with the benefit of this disclosure that the described components may be integrated together in a single component or separated into multiple components.

FIGS. 2-8 illustrate flow diagrams of example methods related to bursty detection for message streams. The methods may be performed by processing logic that may include hardware (circuitry, dedicated logic, etc.), software (such as is run on a general purpose computer system or a dedicated machine), or a combination of both, which processing logic may be included in the bursty message manager 112 or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
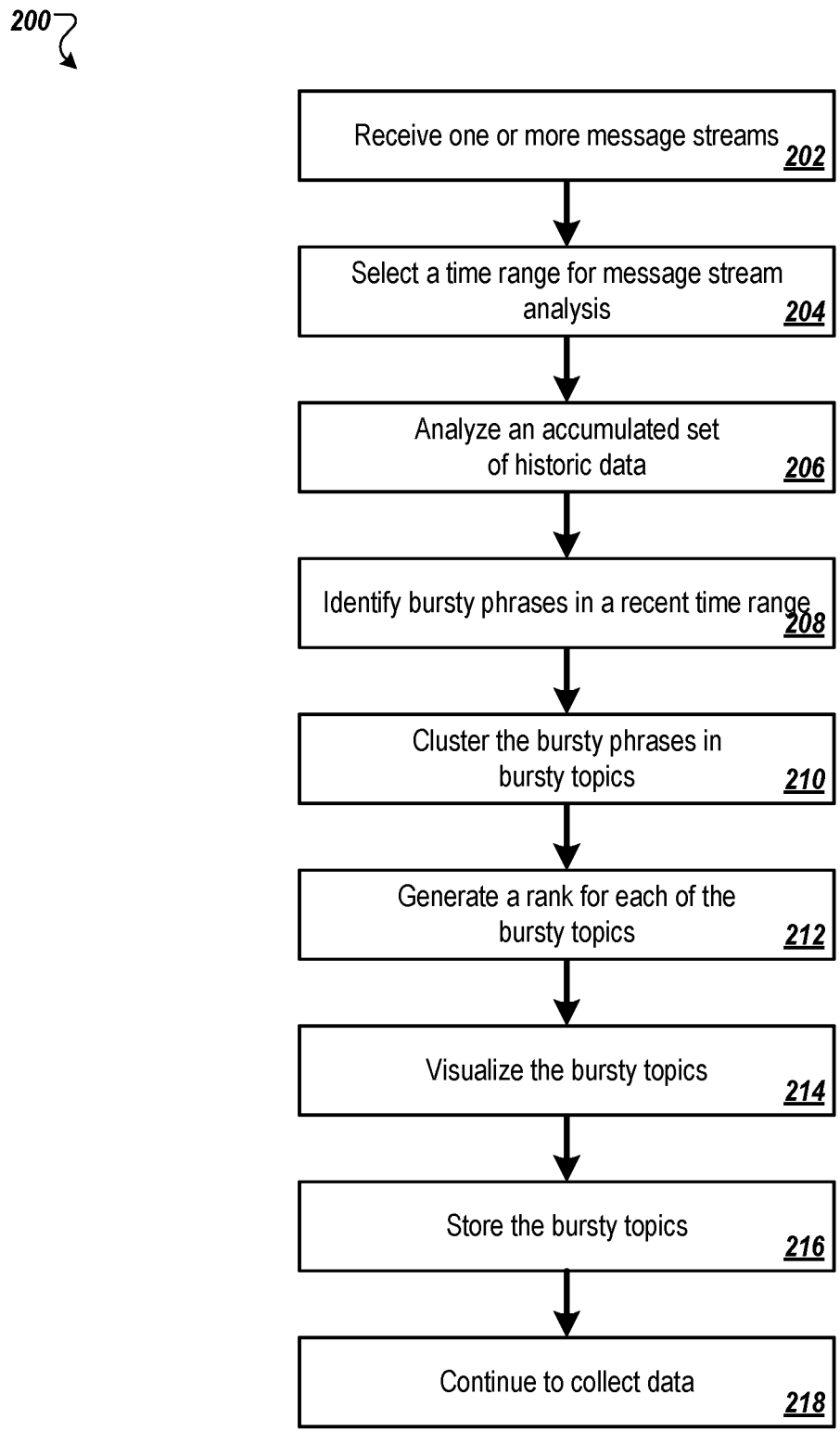
FIG. 2 illustrates a flow diagram of an example method of identifying and displaying one or more bursty topics.

FIG. 2 illustrates a flow diagram of an example method 200 of identifying and displaying one or more bursty topics. The method 200 may begin at block 202, where processing logic may receive one or more electronic message streams. Each of the one or more electronic message streams may include multiple electronic messages. The processing logic may receive the one or more message streams via a network, such as the Internet. The processing logic may receive the one or more message streams by accessing an online content host (e.g., content host 120, 130 of FIG. 1). The processing logic may access (e.g., push or pull) messages from the online content host.

At block 204, the processing logic may select a time range for analysis of the one or more electronic message streams. In at least one embodiment, the processing logic may select a time range. The time range may include a range of time ending at the present time and starting some time before the present time. In at least one embodiment, the time range may be selected based on practical application requirements, data features, and volume in each period of time. For example, the time range may include one month, one week, one day, or any other range of time. In an example, a volume of messages in a day is a relatively small number so one day may not be selected as the time range. Instead, a larger period of time with a higher volume of messages (e.g., one week) may be selected.

At block 206, the processing logic may analyze s set of historic data of the one or more electronic message streams. Additional details related to analyzing the set of historic data of the one or more electronic message streams are described in conjunction with FIGS. 3 and 4.

At block 208, the processing logic may identify one or more bursty phrases in the set of historic data of the one or more electronic message streams in the selected time range. Additional details related to identifying one or more bursty phrases in the set of historic data of the one or more electronic message streams in the selected time range are described in conjunction with FIGS. 5 and 6.

At block 210, the processing logic may cluster the bursty phrases in one or more bursty topics. Additional details related to clustering the bursty phrases in one or more bursty topics are described in conjunction with FIG. 7.

At block 212, the processing logic may generate a rank for each of the one or more bursty topics. To generate a rank for each of the one or more bursty topics, the processing logic may calculate a weight for each of the bursty topics. For example, the processing logic may calculate total weights of the bursty phrases, or total weights of bursty phrases contained in an overlapping duration of time. In at least one embodiment, the processing logic may generate the rank for each of the one or more bursty topics, as further described in conjunction with FIGS. 6 and 7. The processing logic may rank the bursty topics based on their respective calculated weights.

At block 214, the processing logic may display the one or more bursty topics in a graphical user interface (GUI) in view of the rank. In at least one embodiment, the processing logic may present the one or more bursty topics in the GUI ordered according to their respective ranks. The processing logic may present the one or more bursty topics in a navigation GUI with bursty time-series charts and associated messages.

At block 216, the processing logic may store the one or more bursty topics. The processing logic may store the one or more bursty topics in a data storage.

Figure 3:
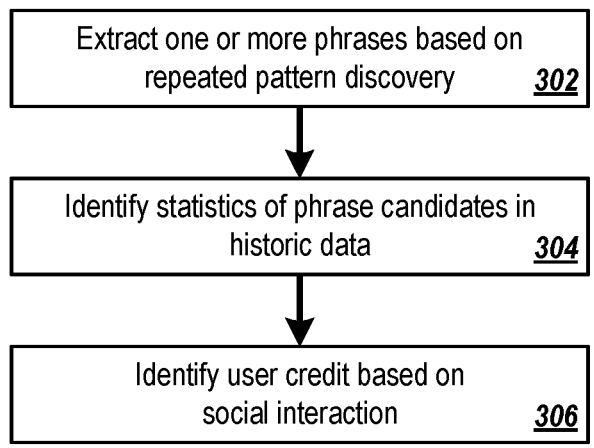
FIG. 3 illustrates a flow diagram of an example method of analyzing a set of historic data of the one or more electronic message streams.

At block 218, the processing logic may collect additional data from the one or more electronic message streams. For example, the processing logic may continue to receive messages from the electronic message streams. In at least one embodiment, the processing logic may update the rank for each of the one or more bursty topics based on the additional data from the one or more electronic message streams FIG. 3 illustrates a flow diagram of an example method 300 of analyzing a set of historic data of the one or more electronic message streams. The method 300 may begin at block 302, where processing logic may extract one or more phrases from the set of historic data based on repeated pattern discovery of the one or more phrases in the set of historic data. Additional details related to extracting one or more phrases from the set of historic data based on repeated pattern discovery of the one or more phrases in the set of historic data are described in conjunction with FIG. 4.

At block 304, the processing logic may identify statistics of phrase candidates in the historic data. Example statistics of phrases may include term frequency, document frequency, average frequency, etc. The term frequency may refer to a number of occurrences of a phrase (e.g., the term) in a specified time window or range. The document frequency may refer to a number of messages containing a phrase (e.g., the term) in a specified time window or range. The average frequency may refer to a speed, which may be represented by the term frequency divided by the time window size or range.

At block 306, the processing logic may identify a user credit based on social interaction. The social interaction may include, for example, a follow of another user in a social network, a mention of another user in the social network, etc. The processing logic may calculate the user credit based on analysis of the social network. For example, the processing logic may look at PageRank statistics, and/or betweenness, where betweenness may include a measure of centrality in a graph based on shortest paths.

Figure 4:
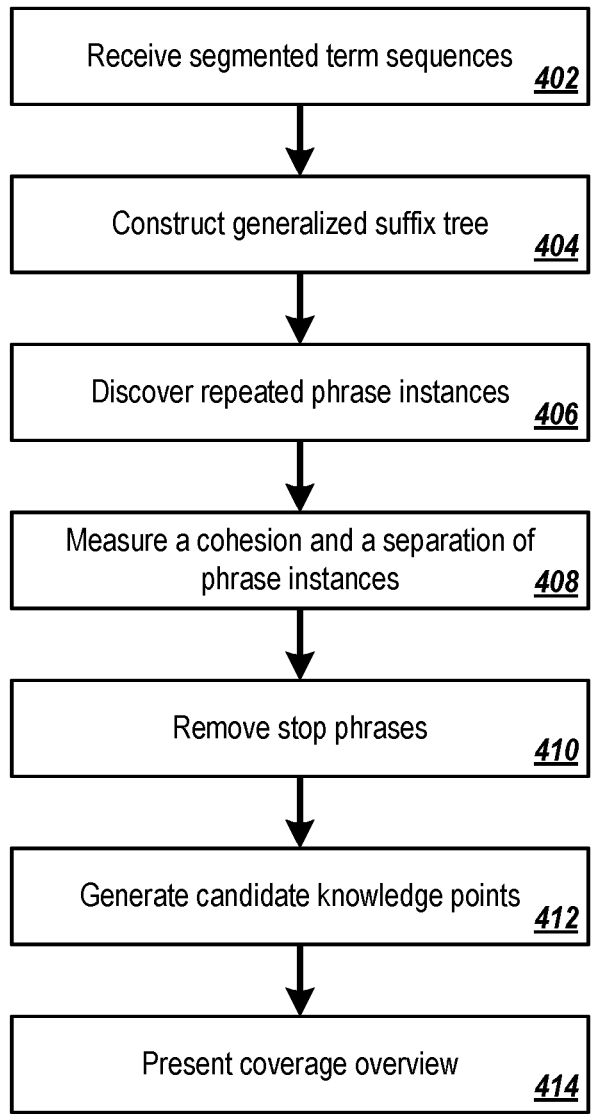
FIG. 4 illustrates a flow diagram of an example method of extracting one or more phrases from the set of historic data based on repeated pattern discovery of the one or more phrases in the set of historic data.

FIG. 4 illustrates a flow diagram of an example method 400 of extracting one or more phrases from the set of historic data based on repeated pattern discovery of the one or more phrases in the set of historic data.

The method 400 may begin at block 402 where the processing logic may receive segmented term sequences. The segmented term sequences may have positional information indicating a position in the message streams of the segmented term sequence.

At block 404, the processing logic may construct a generalized suffix tree of the segmented term sequences. At block 406, the processing logic may discover repeated phrase instances from the segmented term sequences. The phrase instances may be limited by a particular maximum length. At block 408, the processing logic may measure a cohesion and/or a separation of the segmented term sequences. The cohesion may be measured according to a mutual information cohesion metric. Additionally or alternatively, the separation may be measured according to an accessor variety separation metric. Performance of a cohesion and/or separation of the segmented term sequences may help filter out some phrases with repeated instances.

At block 410, the processing logic may remove stop phrases from the segmented term sequences. Stop phrases may generally include words that are removed prior to analysis. Some examples of the stop phrases may include domain-specific words such as "lecture" or "notes" as well as general stop words such as "the," or "a."

At block 412, the processing logic may generate candidate knowledge points from the segmented term sequences. At block 414, the processing logic may present a coverage overview. For example, the coverage overview may be presented on a user interface device of a user device such as a user display. The coverage overview may include appearance distribution in different messages.

Figure 5:
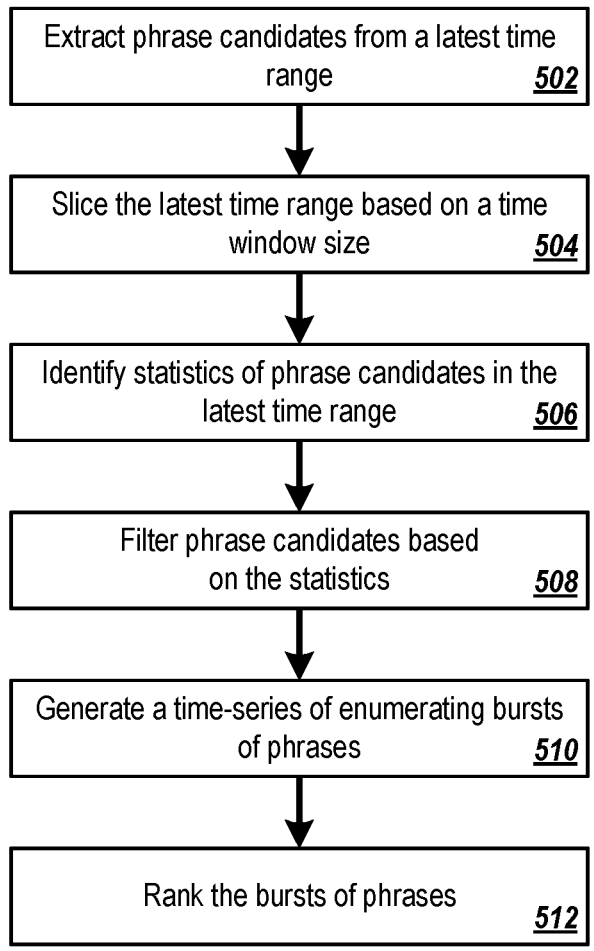
FIG. 5 illustrates a flow diagram of an example method of identifying one or more bursty phrases in the set of historic data of the one or more electronic message streams in the selected time range.

FIG. 5 illustrates a flow diagram of an example method 500 of identifying one or more bursty phrases in the set of historic data of the one or more electronic message streams in the selected time range. The method 500 may begin at block 502 where the processing logic may extract phrase candidates from set of historic data within the time range. The phrase candidates may be updated based on repeated pattern discovery.

At block 504, the processing logic may slice the time range based on a time window size. The time window size may be specified based on various requirements for analysis granularity and/or timeliness.

At block 506, the processing logic may identify statistics of the phrase candidates in latest time range. Example statistics in the latest time range may include a term (phrase) range: Tf_range. Example statistics in each time window may include a term (phrase) frequency in a time window: Tf_w, Speed s=tf_w/window_size (Average frequency), and Acceleration a=\delta(s)/window_size, where \delta(s)/ refers to a speed change in a time window or range.

At block 508, the processing logic may filter the phrase candidates based on the identified statistics. In at least one embodiment, the processing logic may filter the phrase candidates based on threshold on statistics of phrase candidates. For example, a condition may include Tf_range>threshold_tf. Another example condition for one of the sliced windows may include: Speed S>threshold_s, and Acceleration a>threshold_a. If one phrase candidate does not satisfy the condition, then the processing logic may filter out that phrase candidate. The corresponding threshold may be selected based on concrete data sets and practical application requirements.

At block 510, the processing logic may generate a time-series of enumerating bursts of phrases. Additional details related to generating a time-series of enumerating bursts of phrases are described in conjunction with FIG. 6.

At block 512, the processing logic may rank the bursts of phrases. Bursts of positive intensity may have a weight as represented by the following equation:

$$bw(t_k, t_l) = \Sigma_{t=t_k}^{t_l}(\sigma(0, r_t, d_t) - \sigma(1, r_t, d_t)),$$

where bw represents the weight of the burst, where $r_t$ represents relevant documents, and where $d_t$ represents a total number of documents. Bursts of larger weight may correspond to more prominent periods of elevated activity of a phrase. The processing logic may rank bursts of phrases based on their bursty weight values.

Figure 6:
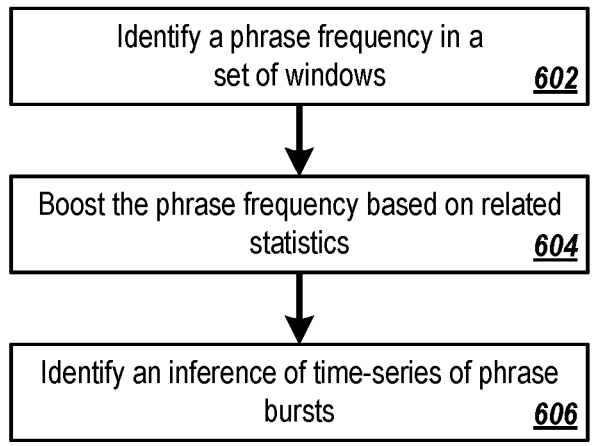
FIG. 6 illustrates a flow diagram of an example method of generating a time-series of enumerating bursts of phrases.

FIG. 6 illustrates a flow diagram of an example method 600 of generating a time-series of enumerating bursts of phrases. The method 600 may begin at block 602 where the processing logic may identify a phrase frequency in a set of windows of time. In an example, there may be m sliced time windows, and the t th window W_t contains r_t phrases out of total phrases d_t. In this example, R=\sum_{1}^{m} r_t and D=\sum_{1}^{m} d_t. In this example, there are m time windows in total. In the t-th time window W_t, the number of a specific phrase is r_t, and the number of all phrases is d_t. R is sum of r_t in all m time windows (1<=t<=m). D is sum of d_t in all m time windows (1<=t<=m).

At block 604, the processing logic may boost the phrase frequency based on related statistics. The processing logic may boost and update an original phrase frequency. For example, the processing logic may boost and update the original phrase frequency according to the following:

r_t_new=\alpha*tf–idf+\beta*user_credit+
\gamma*r_t

The processing logic may also update R and D accordingly. In at least some embodiments, In original r_t, each term or phrase has weight 1. The processing logic may adjust the weight of each term or phrase with its tf–idf. The processing logic may also adjust the weight with user credit, which may include a total credit score of all users who create messages that contain a specific phrase in time window W_t. In at least some embodiments, the terms \alpha, \beta, \gamma may include linear combination factors. In at least some embodiments, \alpha+\beta+\gamma=1.

At block 606, the processing logic may identify an inference of time-series of phrase bursts. For example, the processing logic may use a 2-state automaton, where the state q_0 denotes the non-burst state, while the state q_1 denotes the burst state. For each q_i of the two states q_0 and q_1, there is an expected fraction p_i for the current phrase. The processing logic may set p_0=R/D, and p_1=p_0*s, where s>1 is a scaling parameter, while $p_1 \leq 1$ holds for p_1. (such as s=2).

Viewed in a generative fashion, state $q_i$ produces a mixture of relevant and irrelevant documents according to a binomial distribution with probability $p_i$. The cost of a state sequence $q=(q_{i1}, \ldots, q_{in})$ in B*s,γ is defined as follows. If the automaton is in state $q_i$ when the t-th batch arrives, a cost of $$\sigma(i, r_t, d_t) = -\ln\left[\binom{d_t}{r_t} p_i^{r_t}(1 - p_i)^{d_t - r_t}\right]$$

is incurred, since this is the negative logarithm of the probability that $r_t$ relevant documents would be generated using a binomial distribution with probability $p_i$. There is also a cost of $\tau$ $(i_t, i_{t+1})$ associated with the state transition from $qi_t$ to $qi_{t+1}$, where this cost is defined precisely as for A*s,γ. A state sequence of minimum total cost can then be computed. Given a sequence of time windows W=(W_1, \ldots, W_m), the goal is to find a state sequence q=(q_i_1, \ldots, q_i_m) that minimizes the cost function, as in $$c(q \mid B) = \left(\sum_{t=0}^{m-1} \tau(i_t, i_{t+1})\right) + \left(\sum_{t=1}^{m} \sigma(i_t, r_t, d_t)\right)$$

This is a dynamic planning problem that may be solved with a Viterbi algorithm.

Figure 7:
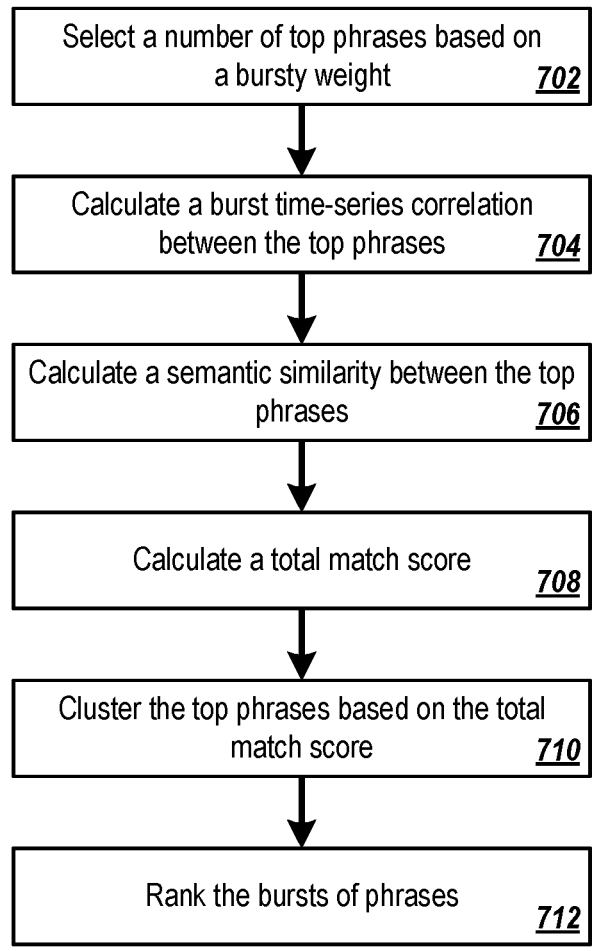
FIG. 7 illustrates a flow diagram of an example method of clustering the bursty phrases in one or more bursty topics.

FIG. 7 illustrates a flow diagram of an example method 700 of clustering the bursty phrases in one or more bursty topics. The method 700 may begin at block 702 where the processing logic may select a number of top phrases based on a bursty weight, which may include the weight calculated at block 212 of FIG. 2 or at block 512 of FIG. 5. The number of top phrases may include any number.

At block 704, the processing logic may calculate a burst time-series correlation between the number of top phrases. For each top phrase, the processing logic may determine whether the correlation score is greater than a threshold correlation. When the correlation score is greater than the threshold correlation, the processing logic may calculate a semantic similarity (at block 706). When the correlation score is not greater than the threshold correlation, the processing logic may skip the current phrase. If all of the phrases are skipped, then the processing logic may not merge any phrases in to the cluster.

At block 706, the processing logic may calculate a semantic similarity between the number of top phrases. In at least one embodiment, the processing logic may use LDS or word2vec to calculate semantic similarity between phrases. For example, the processing logic may use an existing model trained based on an external source, such as WIKIPEDIA or GOOGLE NEWS. When enough new data is accumulated outside of the external source, the processing logic may train a model based on the new data.

At block 708, the processing logic may calculate a total match score. The total match score may be represented as: a*correlation_score+b*semantic_core, where a+b=1.

At block 710, the processing logic may cluster the top phrases based on the total match score. The processing logic may use hierarchical clustering and may also use a threshold when clustering. At block 712, the processing logic may rank the bursts of phrases.

Figure 8:
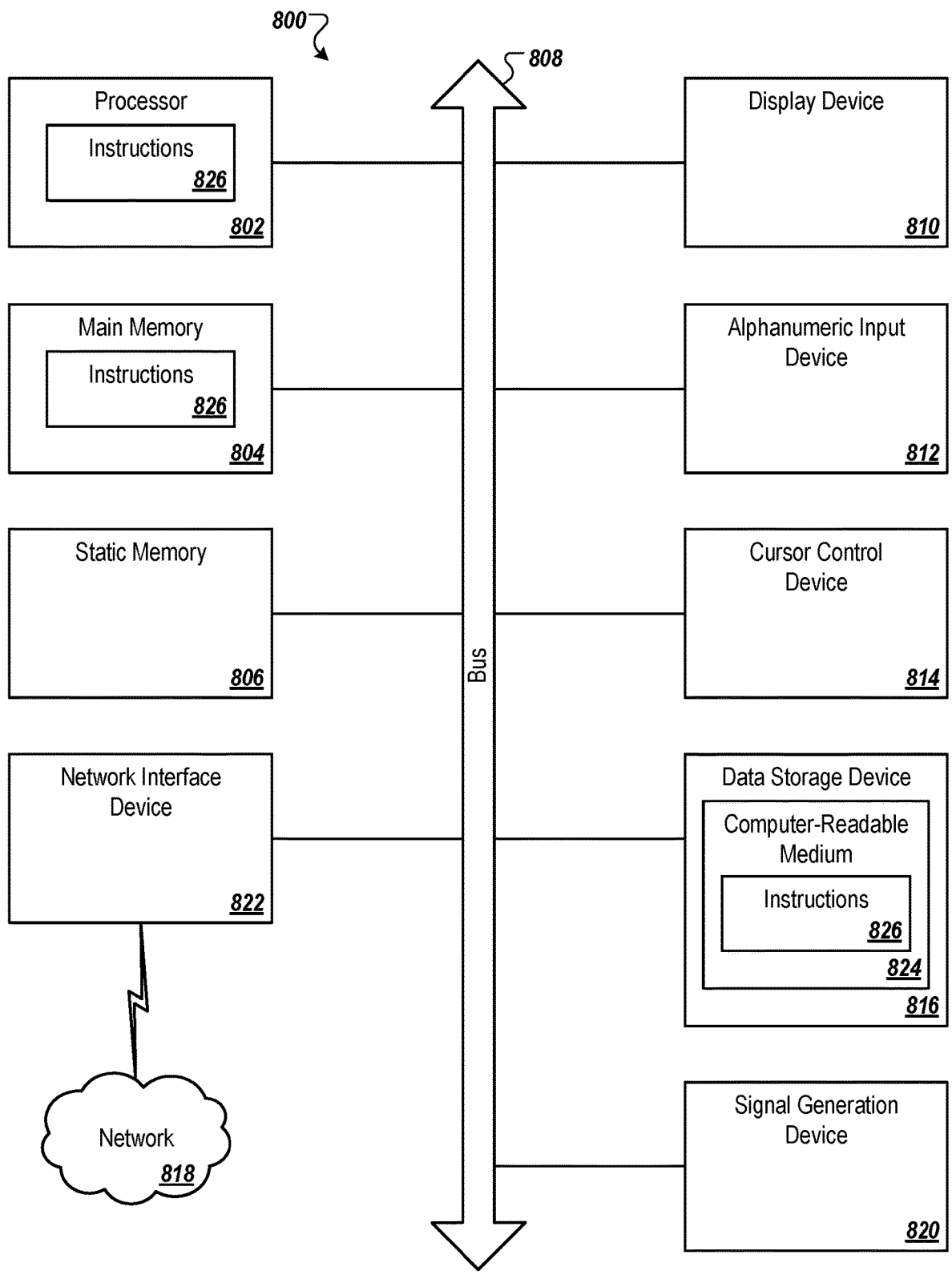
FIG. 8 illustrates a diagrammatic representation of a machine in the example form of a computing device within which a set of instructions, for causing the machine to perform any one or more of the methods discussed herein, may be executed, and all arranged in accordance with at least one embodiment described herein.

FIG. 8 illustrates a diagrammatic representation of a machine in the example form of a computing device 800 within which a set of instructions, for causing the machine to perform any one or more of the methods discussed herein, may be executed. The computing device 800 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In at least one embodiment, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 (e.g., bursty message manager 112) embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method, performed by one or more processing devices, comprising:
   receiving one or more user-generated electronic message streams, each of the one or more electronic message streams including a plurality of electronic messages that include human-readable content;
   selecting a time range for analysis of the one or more electronic message streams, each electronic message of the plurality of electronic messages being associated with a particular respective time that is within the time range;
   analyzing a set of historic data of the one or more electronic message streams, wherein the analyzing the set of historic data comprises:
      extracting one or more phrases from the set of historic data based on repeated pattern discovery of the one or more phrases in the set of historic data;
      identifying statistics of phrase candidates in the historic data; and
      identifying a user credit based on social interaction;
   identifying a plurality of bursty phrases that are human-readable in the set of historic data of the one or more electronic message streams in the time range, wherein the plurality of bursty phrases each occur in the set of historic data above a threshold occurrence amount in the time range;
   calculating a semantic similarity between the plurality of bursty phrases;
   clustering the bursty phrases in one or more bursty topics based on the semantic similarity between the plurality of bursty phrases and based on the particular respective time of each electronic message;
   generating a rank for each of the one or more bursty topics;
   displaying the one or more bursty topics as a time-series in a graphical user interface (GUI) in view of the rank; and
   storing the one or more bursty topics.

2. The method of claim 1, wherein the extracting the one or more phrases based on repeated pattern discovery of the one or more phrases comprises:
   receiving segmented term sequences;
   constructing generalized suffix trees of the segmented term sequences;

discovering repeated phrase instances of the segmented term sequences, wherein the phrase instances have a maximum length;
measuring a cohesion and a separation of the segmented term sequences;
removing stop phrases from the segmented term sequences;
generating candidate knowledge points from the segmented term sequences; and
presenting a coverage overview of different sources.

3. The method of claim 2, wherein the identifying the one or more bursty phrases in the time range comprises:
extracting phrase candidates from the time range;
slicing the time range based on a time window size;
identifying statistics of the phrase candidates in the time range;
filtering the phrase candidates based on the statistics;
generating a time-series of enumerating bursts of phrases; and
ranking the bursts of phrases.

4. The method of claim 3, wherein the generating the time-series of enumerating bursts of phrases comprises:
identifying a phrase frequency in a set of windows of time;
boosting the phrase frequency based on related statistics; and
identifying an inference of time-series of phrase bursts.

5. The method of claim 1, wherein the clustering the bursty phrases in the one or more bursty topics comprises;
selecting top phrases based on a bursty weight;
calculating a burst time-series correlation between the top phrases;
calculating a semantic similarity between the top phrases;
calculating a total match score;
clustering the top phrases based on the total match score; and
ranking the bursts of phrases.

6. The method of claim 1, further comprising:
collecting additional data from the one or more electronic message streams; and
updating the rank for each of the one or more bursty topics based on the additional data from the one or more electronic message streams.

7. A non-transitory computer-readable medium having encoded therein programming code executable by a processor to perform operations comprising:
receiving one or more user-generated electronic message streams, each of the one or more electronic message streams including a plurality of electronic messages that include human-readable content;
selecting a time range for analysis of the one or more electronic message streams, each electronic message of the plurality of electronic messages being associated with a particular respective time that is within the time range;
analyzing a set of historic data of the one or more electronic message streams, wherein the analyzing the set of historic data comprises:
extracting one or more phrases from the set of historic data based on repeated pattern discovery of the one or more phrases in the set of historic data;
identifying statistics of phrase candidates in the historic data; and
identifying a user credit based on social interaction;
identifying a plurality of bursty phrases in the set of historic data of the one or more electronic message streams in the time range, wherein the plurality of bursty phrases each occur in the set of historic data above a threshold occurrence amount in the time range;
calculating a semantic similarity between the plurality of bursty phrases;
clustering the bursty phrases in one or more bursty topics based on the semantic similarity between the plurality of bursty phrases and based on the particular respective time of each electronic message;
generating a rank for each of the one or more bursty topics;
displaying the one or more bursty topics as a time-series in a graphical user interface (GUI) in view of the rank; and
storing the one or more bursty topics.

8. The non-transitory computer-readable medium of claim 7, wherein the extracting the one or more phrases based on repeated pattern discovery of the one or more phrases comprises:
receiving segmented term sequences;
constructing generalized suffix trees of the segmented term sequences;
discovering repeated phrase instances of the segmented term sequences, wherein the phrase instances are limited by a particular maximum length;
measuring a cohesion and a separation of the segmented term sequences;
removing stop phrases from the segmented term sequences;
generating candidate knowledge points from the segmented term sequences; and
presenting a coverage overview of different sources.

9. The non-transitory computer-readable medium of claim 8, wherein the identifying the one or more bursty phrases in the time range comprises:
extracting phrase candidates from the time range;
slicing the time range based on a time window size;
identifying statistics of the phrase candidates in the time range;
filtering the phrase candidates based on the statistics;
generating a time-series of enumerating bursts of phrases; and
ranking the bursts of phrases.

10. The non-transitory computer-readable medium of claim 9, wherein the generating the time-series of enumerating bursts of phrases comprises:
identifying a phrase frequency in a set of windows of time;
boosting the phrase frequency based on related statistics; and
identifying an inference of time-series of phrase bursts.

11. The non-transitory computer-readable medium of claim 7, wherein the clustering the bursty phrases in the one or more bursty topics comprises;
selecting top phrases based on a bursty weight;
calculating a burst time-series correlation between the top phrases;
calculating a semantic similarity between the top phrases;
calculating a total match score;
clustering the top phrases based on the total match score; and
ranking the bursts of phrases.

12. The non-transitory computer-readable medium of claim 7, further comprising:
collecting additional data from the one or more electronic message streams; and updating the rank for each of the one or more bursty topics based on the additional data from the one or more electronic message streams.

13. A system comprising:
a memory storing instructions; and
a processing device operatively coupled to the memory, the processing device being configured to execute the instructions to:
receive one or more user-generated electronic message streams, each of the one or more electronic message streams including a plurality of electronic messages that include human-readable content;
select a time range for analysis of the one or more electronic message streams, each electronic message of the plurality of electronic messages being associated with a particular respective time that is within the time range;
analyze a set of historic data of the one or more electronic message streams, wherein the analyzing the set of historic data comprises:
extracting one or more phrases from the set of historic data based on repeated pattern discovery of the one or more phrases in the set of historic data;
identifying statistics of phrase candidates in the historic data; and
identifying a user credit based on social interaction;
identify a plurality of bursty phrases in the set of historic data of the one or more electronic message streams in the selected time range, wherein the plurality of bursty phrases each occur in the set of historic data above a threshold occurrence amount in the time range;
calculate a semantic similarity between the plurality of bursty phrases;
cluster the bursty phrases in one or more bursty topics based on the semantic similarity between the plurality of bursty phrases and based on the particular respective time of each electronic message;
generate a rank for each of the one or more bursty topics;
display the one or more bursty topics as a time-series in a graphical user interface (GUI) in view of the rank; and
storing the one or more bursty topics.

14. The system of claim 13, wherein when extracting the one or more phrases based on repeated pattern discovery of the one or more phrases, the processing device is configured to:
receive segmented term sequences;
construct generalized suffix trees of the segmented term sequences;
discover repeated phrase instances of the segmented term sequences, wherein the phrase instances are limited by a particular maximum length;
measure a cohesion and a separation of the segmented term sequences;
remove stop phrases from the segmented term sequences;
generate candidate knowledge points from the segmented term sequences; and
present a coverage overview of different sources.

15. The system of claim 14, wherein when identifying the one or more bursty phrases in the time range, the processing device is configured to:
extract phrase candidates from the time range;
slice the time range based on a time window size;
identify statistics of the phrase candidates in the time range;
filter the phrase candidates based on the identified statistics;
generate a time-series of enumerating bursts of phrases; and
rank the bursts of phrases.

16. The system of claim 13, wherein when clustering the bursty phrases in the one or more bursty topics, the processing device is configured to:
select a number of top phrases based on a bursty weight;
calculate a burst time-series correlation between the number of top phrases;
calculate a semantic similarity between the number of top phrases;
calculate a total match score;
cluster the top phrases based on the total match score; and
rank the bursts of phrases.

17. The system of claim 13, wherein, the processing device is further configured to:
collect additional data from the one or more electronic message streams; and
update the rank for each of the one or more bursty topics based on the additional data from the one or more electronic message streams.

* * * * *